(12) United States Patent
Logan

(10) Patent No.: US 12,277,867 B2
(45) Date of Patent: Apr. 15, 2025

(54) ENHANCED HUMAN JOINT SIMULATION MODEL

(71) Applicant: Howmedica Osteonics Corp., Mahwah, NJ (US)

(72) Inventor: Scott G. Logan, Oak Ridge, NJ (US)

(73) Assignee: Howmedica Osteonics Corp., Mahwah, NJ (US)

( * ) Notice: Subject to any disclaimer, the term of this patent is extended or adjusted under 35 U.S.C. 154(b) by 1080 days.

(21) Appl. No.: 17/189,850

(22) Filed: Mar. 2, 2021

(65) Prior Publication Data
US 2021/0280087 A1    Sep. 9, 2021

Related U.S. Application Data

(60) Provisional application No. 62/984,593, filed on Mar. 3, 2020.

(51) Int. Cl.
G09B 23/32    (2006.01)
G01N 3/02    (2006.01)

(52) U.S. Cl.
CPC .............. G09B 23/32 (2013.01); G01N 3/02 (2013.01)

(58) Field of Classification Search
CPC . G09B 23/32; G01N 3/02; G01N 3/56; G01N 2203/0246
USPC ...................................................... 434/274
See application file for complete search history.

(56) References Cited

U.S. PATENT DOCUMENTS

| | | | |
|---|---|---|---|
| 4,850,877 A * | 7/1989 | Mason | G09B 23/30 434/274 |
| 7,699,615 B2 * | 4/2010 | Sakezles | G09B 23/28 434/274 |
| 8,108,190 B2 | 1/2012 | Riener et al. | |
| 8,388,351 B2 | 3/2013 | Potti Cuervo et al. | |
| 8,419,437 B2 | 4/2013 | Wesp et al. | |
| 8,425,234 B2 | 4/2013 | Sakezles | |
| 8,805,662 B2 | 8/2014 | White | |
| 11,341,868 B2 | 5/2022 | Horst et al. | |
| 11,468,795 B2 | 10/2022 | Björklund et al. | |

(Continued)

FOREIGN PATENT DOCUMENTS

| | | |
|---|---|---|
| WO | 2021096963 A1 | 5/2021 |
| WO | 2022225599 A1 | 10/2022 |
| WO | 2023061907 A1 | 4/2023 |

OTHER PUBLICATIONS

Tactile Orthopaedics Product Brochure, 2021 Product Portfolio An Experiential Learning Platform, Tactile-Ortho, (Jul. 2021) 14 pgs.

*Primary Examiner* — Robert P Bullington
*Assistant Examiner* — Stephen Alvesteffer
(74) *Attorney, Agent, or Firm* — Lerner David LLP

(57) ABSTRACT

A simulated anatomical joint includes a first artificial bone having a first articular surface, a second artificial bone having a second articular surface matable to the first articular surface to simulate a natural joint, and artificial ligaments connecting the first artificial bone to the second artificial bone. The artificial ligaments connect the first artificial bone to the second artificial bone such that the first articular surface is proximate to the second articular surface. The artificial ligaments connected to the first artificial bone and second artificial bone are adjustable to simulate stresses in a natural anatomical joint corresponding to the first artificial bone and second artificial bone.

19 Claims, 6 Drawing Sheets

(56) References Cited

U.S. PATENT DOCUMENTS

| | | | |
|---|---|---|---|
| 2006/0136058 A1* | 6/2006 | Pietrzak | A61F 2/30942 |
| | | | 623/18.11 |
| 2008/0138781 A1* | 6/2008 | Pellegrin | G09B 23/34 |
| | | | 434/274 |
| 2008/0286736 A1* | 11/2008 | Browne-Wilkinson | ...... |
| | | | G09B 23/32 |
| | | | 623/18.11 |
| 2009/0209884 A1* | 8/2009 | Van Vorhis | G16H 50/50 |
| | | | 600/595 |
| 2012/0276509 A1 | 11/2012 | Iannotti et al. | |
| 2017/0007225 A1* | 1/2017 | Ferro | A61B 17/155 |
| 2021/0280087 A1 | 9/2021 | Logan | |
| 2023/0057349 A1 | 2/2023 | Hsiao-Wecksler et al. | |
| 2023/0138457 A1 | 5/2023 | Rohr Daniel et al. | |
| 2023/0162622 A1 | 5/2023 | Carvajal et al. | |

* cited by examiner

ENHANCED HUMAN JOINT SIMULATION MODEL

CROSS-REFERENCE TO RELATED APPLICATIONS

The present application claims the benefit of U.S. Provisional Application No. 62/984,593, filed on Mar. 3, 2020, the disclosure of which is hereby incorporated herein by reference.

BACKGROUND OF THE INVENTION

Medical training and education frequently includes interacting with and the observation of bone shapes and articulation of joints outside of a live patient. Simple artificial bone models, such as sawbones, may be used for this purpose. Such artificial bone models are commonly constructed according to typical dimensions and features for a given population. The artificial bone models may be assembled to demonstrate how the bones would articulate at certain joints in a live patient and to allow for simulated surgical procedures to be performed on such bones. The lack of realistic ligaments and unique individual features limits the verisimilitude of joints simulated by artificial bone assemblies. The utility of known bone models is further limited with regard to representation of injuries and deformities, which are frequently atypical by nature and therefor difficult to generalize.

Cadaveric joints may also be observed for training purposes. Cadaveric joints provide some pedagogical advantages over artificial bone models including the presence of soft tissue and unique individual features and deformities. However, it can be difficult or impossible to determine the cause of deformities in cadaveric bones or the impact that such deformities have on quality of life. Moreover, cadavers present with their own unique deformities and ligament structure which may not coincide with classroom instruction dedicated to well defined scenarios a surgeon may face in practice. In this regard, cadavers lack the reproducibility that is helpful in allowing surgeons to troubleshoot particular scenarios to optimize results, as it is impossible to compare a difference in outcomes between two different interventions on a single unique cadaveric joint. Also, cadavers are relatively expensive, in less supply than artificial models, and require special facilities and handling to prevent the spread of infectious diseases that may persist after death. Thus, cadavers may have little value where a surgeon is preparing for a particular patient's anatomy in accordance with their preoperative routine or as part of a particular training regimen.

The training value in both simulated and cadaveric joints is further limited by the amount of information that a student or clinician can derive from merely observing or manipulating a joint. Visual and tactile information presented from a joint only enables the student or clinician to estimate stresses resulting from deformities or interventions, which can impede both the determination of the proper intervention for a given deformity and the assessment of an intervention after it has been enacted.

BRIEF SUMMARY OF THE INVENTION

In one aspect of the present disclosure, a simulated anatomical joint is created from patient specific data. The simulated anatomical joint includes at least two artificial bones connected by artificial ligaments and/or tendons. If the patient's joint includes any bone deformities, such as those resulting from disease or injury, the deformities will be reproduced in the artificial bones. In some arrangements, the artificial ligaments and/or tendons are provided with tension adjusting features such as ferrules crimped onto free ends of the artificial ligaments and/or tendons and threadingly engaged with openings in the artificial bones. The tension adjusting features may be used to reflect any soft tissue injury or disease afflicting the patient from which the patient specific data is sourced. In some arrangements, at least one of the artificial ligaments and/or tendons are fitted with stress measurement features, such as a Wheatstone bridge, connected to a processor, data communication element, display, or any combination thereof.

In another aspect of the present disclosure, a method of assessing an intervention that may be used to treat an injury or disease condition includes producing the above described simulated anatomical joint, applying the intervention to the simulated anatomical joint, and analyzing the outcome of the intervention. Assessing the outcome of the intervention may include observing articulation of the simulated anatomical joint and stress measurements from the one or more stress measurement features at one or more positions within the simulated anatomical joint's range of articulation. In further arrangements, the method includes producing multiple identical simulated anatomical joints according to the same set of patient specific data, or according to patient specific data sourced from the same patient and the same joint. Different interventions are applied to each of the multiple identical simulated anatomical joints and the differing outcomes can be compared between the joints. The method may be used to choose or assess an intervention for the patient's injured or diseased joint.

In another aspect, a simulated anatomical joint includes a first artificial bone having a first articular surface, a second artificial bone having a second articular surface matable to the first articular surface to simulate a natural joint, and artificial ligaments connecting the first artificial bone to the second artificial bone. The artificial ligaments connect the first artificial bone to the second artificial bone such that the first articular surface is proximate to the second articular surface. The artificial ligaments connected to the first artificial bone and second artificial bone are adjustable to simulate stresses in a natural anatomical joint corresponding to the first artificial bone and second artificial bone.

In some arrangements, the simulated human joint further includes a stress measurement device connected to at least one of the artificial ligaments and configured to measure stress in the artificial ligament connected to the measurement device.

In some arrangements, the simulated anatomical joint further includes a display configured to display force measured by the stress measurement device.

In some arrangements, the stress measurement device includes a Wheatstone bridge.

In some arrangements, the natural anatomical joint is a joint within a specific patient, and the first artificial bone and second artificial bone are constructed according to patient specific data collected from the natural anatomical joint.

In some arrangements, the patient specific data collected from the natural anatomical joint includes computed tomography data.

In some arrangements, the natural anatomical joint is a human knee joint.

In some arrangements, either or both of the first articular surface and the second articular surface includes a feature that would be considered a deformity if detected in the natural anatomical joint.

In some arrangements, a method of constructing a simulated human joint includes gathering patient specific data from a natural anatomical joint to be simulated, constructing artificial bones having articular surfaces corresponding to articular surfaces of bones in the joint to be simulated using the patient specific data, and connecting the artificial bones in an arrangement corresponding to the joint to be simulated with artificial ligaments.

In some arrangements, the connecting step includes adjustably tensioning the ligaments to simulate stresses in the joint to be simulated.

In some arrangements, the natural anatomical joint includes a bony deformity.

In some arrangements, the constructing step includes reproducing the bony deformity in the corresponding artificial bone.

In some arrangements, the step of gathering patient specific data includes a computed tomography scan.

In some arrangements, the natural anatomical joint is a human knee joint.

In some arrangements, the method includes a step of implanting a stress measurement device configured to measure stress in the simulated anatomical joint into at least one of the artificial bones.

In some arrangements, the stress measurement device is a Wheatstone bridge.

In another aspect, a method of assessing a surgical intervention on an anatomical joint includes observing a simulated joint. The simulated joint includes a first artificial bone having a first articular surface, a second artificial bone having a second articular surface matable to the first articular surface to simulate the anatomical joint, and artificial ligaments connecting the first artificial bone to the second artificial bone such that the first articular surface is proximate to the second articular surface. The artificial ligaments are connected to the first artificial bone and second artificial bone and adjustably tensioned to a designated tension to simulate stresses in a natural anatomical joint corresponding to the artificial bones. The first and second artificial bones are produced according to patient specific data gathered from the natural joint such that the first and second artificial bones reflect a patient specific deformity on an articular surface of the natural joint. The method further includes resecting the simulated joint having the patient specific deformity on a simulated articular surface in accordance with a first intervention, implanting a joint prosthesis onto the resected simulated joint to form a simulated post-intervention joint, and assessing the first intervention by observing the joint stability of the simulated post-intervention joint based on the designated tension.

In some arrangements, either one or both of the first artificial bone and the second artificial bone include a stress measurement device configured to measure stress in the simulated anatomical joint.

In some arrangements, the observing and assessing steps include consideration of a stress measurement from the stress measurement device.

In some arrangements, the stress measurement device includes a Wheatstone bridge.

DETAILED DESCRIPTION

Figure 1:
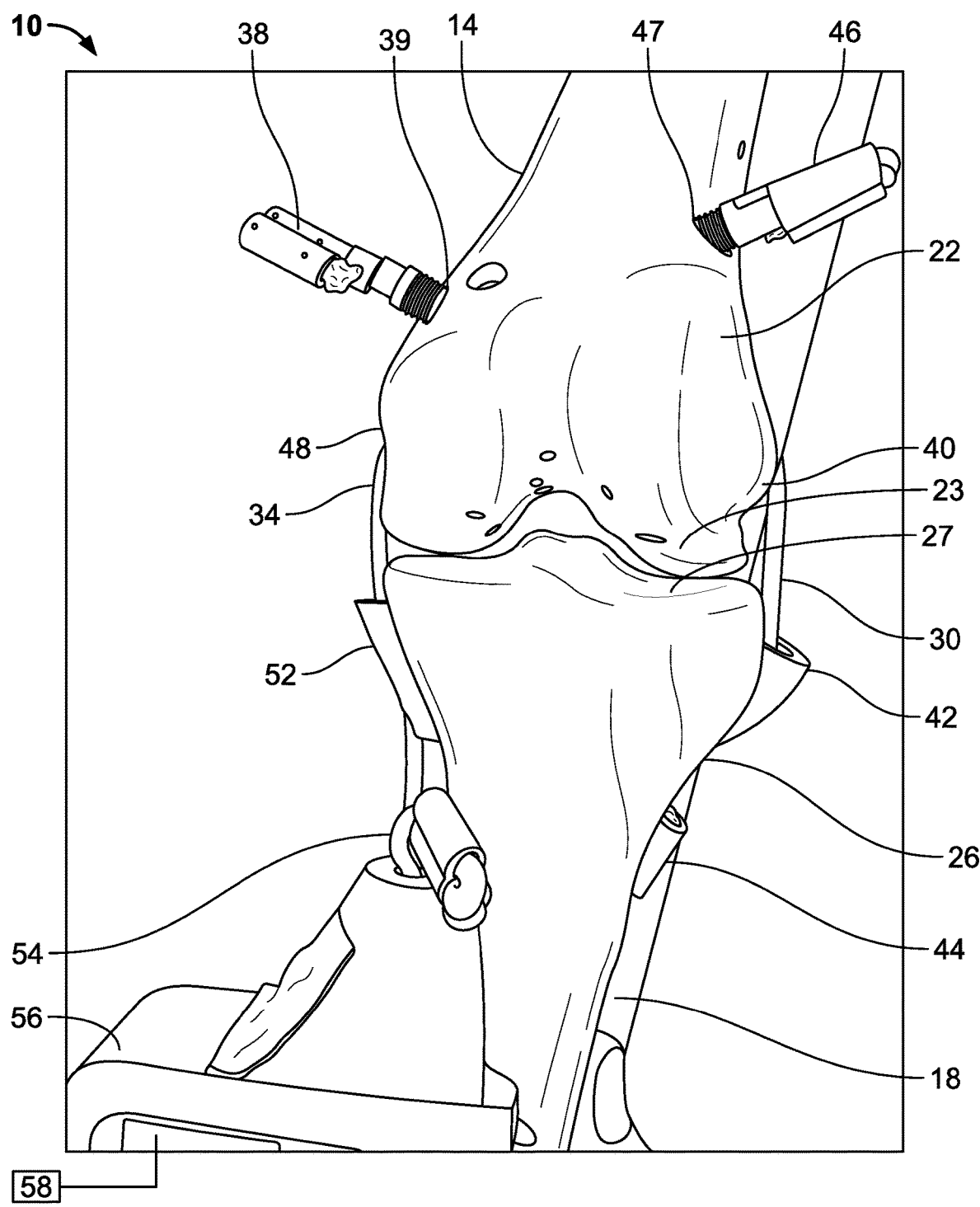
FIG. 1 is a front plan view of a simulated anatomical joint according to an aspect of the disclosure.

A simulated anatomical joint 10 shown in FIG. 1 includes a first artificial bone 14 and a second artificial bone 18, respectively having a first anatomical head 22 and a second anatomical head 26. A first articular surface 23 and a second articular surface 27, disposed on the first anatomical head 22 and second anatomical head 26, respectively, meet to simulate a joint. In the illustrated example, the first bone 14 and second bone 18 are an artificial femur and tibia, respectively, simulating a knee joint, though the concepts and processes within the present disclosure may be applied to any human or animal bone joint, such as a hip or shoulder joint, for example. The first and second articular surfaces 23, 27 represent a particular anatomical/deformity scenario found in practice. In this regard, first and second heads 22 and 26 may be constructed from one or more medical images, such as an MRI, so as to reproduce a particular articular surface scenario. For example, a lateral condyle and/or medial condyle of a patient may have 1-3 mm of cartilage wear while the other condyle may have more or less wear. Thus, anatomical heads may be constructed to represent various scenarios found in practice for teaching purposes or may be constructed to represent a specific patient as part of a surgeon's preoperative plan, for example. This allows a clinician to perform a simulated surgical procedure on the first and second heads 22, 26 using standard instrumentation to help determine depth of resections and resection orientations in order to achieve the desired joint line.

The first artificial bone 14 and second artificial bone 18 are held together to simulate the joint by a first artificial ligament 30 and a second artificial ligament 34. Materials for the artificial ligaments may be chosen for their consistency, such that multiple simulations of the same joint will generally exhibit the same characteristics, or for their similarity to natural ligaments, among other characteristics. An exemplary suitable material for the artificial ligaments 30, 34 is multi-strand nylon parachute cord. Such parachute cord is available in a number of diameters and bundle configurations. A parachute cord diameter and bundle arrangement may be selected on a case by case basis, for example by estimating the properties of the tendon to be simulated according to the individual patient (including consideration of factors such as age, lifestyle, disease, and physical condition) and the joint, assessing the condition of the tendon from data gathered from the patient, or both. A variety of polymers are also suitable for the artificial ligaments. The polymer cords may be unitary or, like the parachute cord, formed in bundles of a number and diameter appropriate for the particular ligament to be simulated.

The first artificial ligament 30 is connected to the first artificial bone 14 by a first ferrule 38 crimped onto the first artificial ligament 30 and threaded into a first threaded opening 39 in the first bone 14. The first artificial ligament 30 extends across and through the first anatomical head 22 to a first opening or duct 40 located in the first anatomical head 22 across from the first ferrule 38. The first artificial ligament 30 extends from the first opening 40 to a first opening or duct 42 of the second anatomical head 26, then through the first opening 42 to a first attachment 44 of the second anatomical head. The second artificial ligament 34 is similarly connected to the first artificial bone 14 by a second ferrule 46 crimped onto the second artificial ligament 34 and threaded into a second threaded opening 47 in the first artificial bone 14 across from the first ferrule 38. The second artificial ligament 34 extends across and through the first anatomical head 22 to a second opening or duct 48 located in the first anatomical head 22 across from the second ferrule 46. The second artificial ligament 34 extends from the second opening 48 of the first anatomical head 22 to a second opening or duct 52 of the second anatomical head 26, then through the second opening 52 to a second attachment 54. The threaded engagement of the ferrules 38, 46 enables a user to tighten or loosen the artificial ligaments 30, 34 by turning the corresponding ferrule 38, 46 relative to the first artificial bone 14. In addition, openings 40, 42, 48, 52 are located in artificial bones 14 and 18 to represent insertion sites of natural ligaments. In this regard, these openings 40, 42, 48, 52 can vary from artificial model to artificial model to represent different insertion sites and to replicate different anatomical scenarios. However, the locations of these openings 40, 42, 48, 52 are also reproducible so that multiple artificial bones 14, 18 with the same anatomy can be produced so that a clinician can experiment with different techniques or approaches for the same anatomical scenario. As indicated above, this may be achieved by utilizing medical images of a candidate patient who expresses the desired soft tissue anatomy for teaching/experimental purposes or a specific patient about to undergo surgery for preoperative planning purposes.

The second attachment 54 is fitted with a stress measurement feature. In one example, the stress measurement feature is a Wheatstone bridge, but in other examples, other known stress measurement devices may be used. In other arrangements, stress measurement features are fitted any portion of any one or any combination of artificial ligaments in a simulated joint. In further arrangements, one or more stress measurement features may instead or in addition be implanted into any one or any combination of artificial bones in a simulated joint to measure local stresses on one or more artificial bones, such as at an articular surface or a likely fracture point. The stress measurement feature is connected to a microcontroller 56. In the illustrated example, the microcontroller 56 is connected to a display 58 that shows a numerical representation of tension on the second artificial ligament 34. In various arrangements, the microcontroller is further or instead connected in communication with a remote screen, serial cable, Bluetooth transmitter, computer, or any combination of the foregoing. Such stress measurement feature allows a clinician to obtain real-time readings of the stresses on artificial ligaments 30, 34 to help identify and achieve the desired ligament balance through flexion and extension of the artificial joint. In this regard, multiple bone preparation techniques and approaches may be applied to artificial bones 14, 18 with an identical anatomical scenario to determine which technique or approach is best suited for a particular patient.

The first artificial ligament 30 and second artificial ligament 34 of the illustrated arrangement are connected to the simulated anatomical joint 10 in a manner simulating a lateral collateral ligament (LCL) and medial collateral ligament (MCL) respectively. As such, the openings 40, 48 are located in the first anatomical head 22 where the LCL and MCL attach to the femur in a natural knee joint, and the second attachment 54 is located on the second artificial bone 18 where the MCL attaches to the tibia in a natural knee joint. In alternative arrangements, the second attachment 54 is located on the second artificial bone 18 to compensate for differences in material properties between the second artificial ligament 34 and a natural MCL, such that the joint as a whole behaves similarly to a natural knee despite the differences in material properties. Though no bone in the simulated joint corresponds to a fibula, the first duct 42 and the first attachment 44 are located to cooperate in a way that causes the first artificial ligament 30 to act on the simulated joint 10 that a natural MCL connected to a fibula would act on a natural knee joint. It is also contemplated that first and second artificial bones 14 and 18 may also include one or more simulated cruciate ligaments, such as the anterior cruciate ligament (ACL) and posterior cruciate ligament (PCL). While such ligaments are generally sacrificed in total knee arthroplasty, the PCL may be retained in cruciate retaining procedures and the ACL and PCL may be retained in bi-cruciate retaining or unicompartmental/bicompartmental procedures. As such, artificial bones 14 and 18 may be constructed with such ligaments in a similar manner as that of the depicted MCL and LCL (i.e., with ferrules, threaded openings, and ducts) in order to allow for simulated procedures that take into account such ligaments.

Figure 2A:
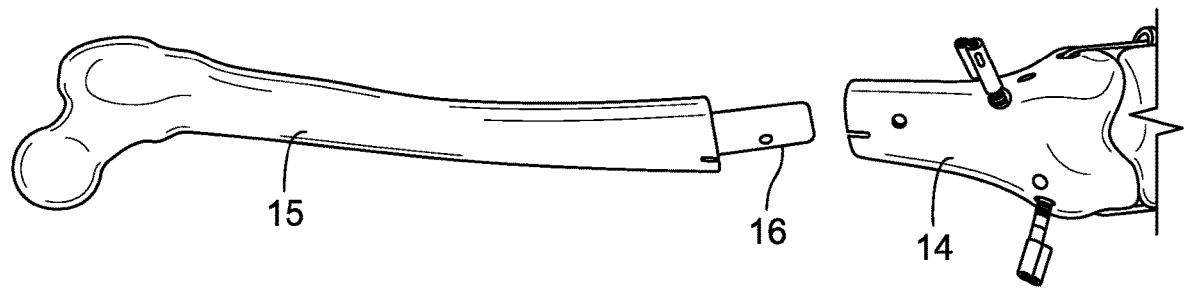
FIGS. 2A-2C are front plan views of modular features of the simulated anatomical joint of FIG. 1.
Figure 2B:
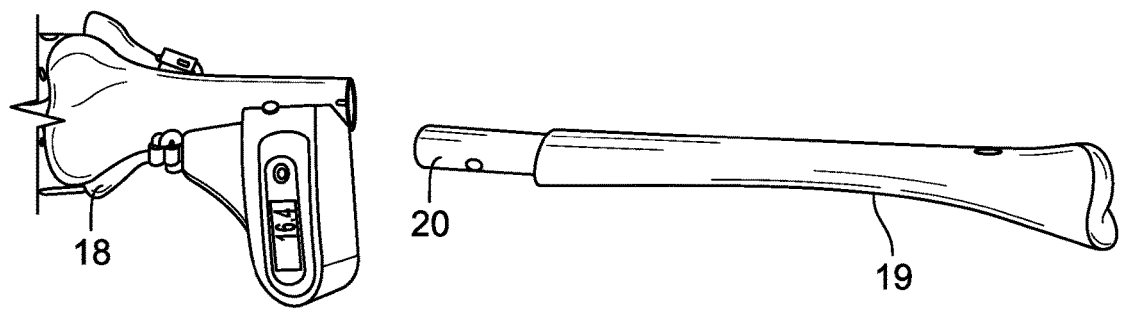
Figure 2C:
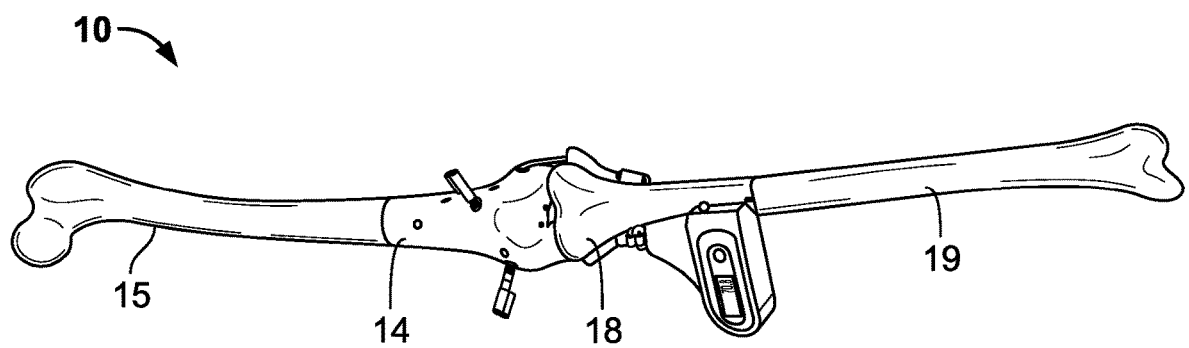

As shown in FIGS. 2A-2C, the simulated anatomical joint 10 may be of a modular construction. In the illustrated arrangement, a first extension 15 may be provided having a first peg 16 that can removably engage a recess in the first artificial bone 14. Similarly, a second extension 19 may be provided having a second peg 20 that can removably engage a recess in the second artificial bone 18. Because the first artificial bone 14 and second artificial bone 18 include the articulating surfaces of the simulated anatomical joint 10, the simulated anatomical joint 10 may be assembled including one, both, or neither of the first extension 15 and second extension 19. The resulting modularity provides differing options for observing behavior of or stresses on the simulated anatomical joint 10. For example, the simulated anatomical joint 10 may be easily manipulated by hand in the absence of the first extension 15 and second extension 19. In other arrangements, the simulated anatomical joint 10 may be fitted either or both of the first extension 15 and second extension 20 for use in experiments simulating action of the joint within a human body.

Figure 3:
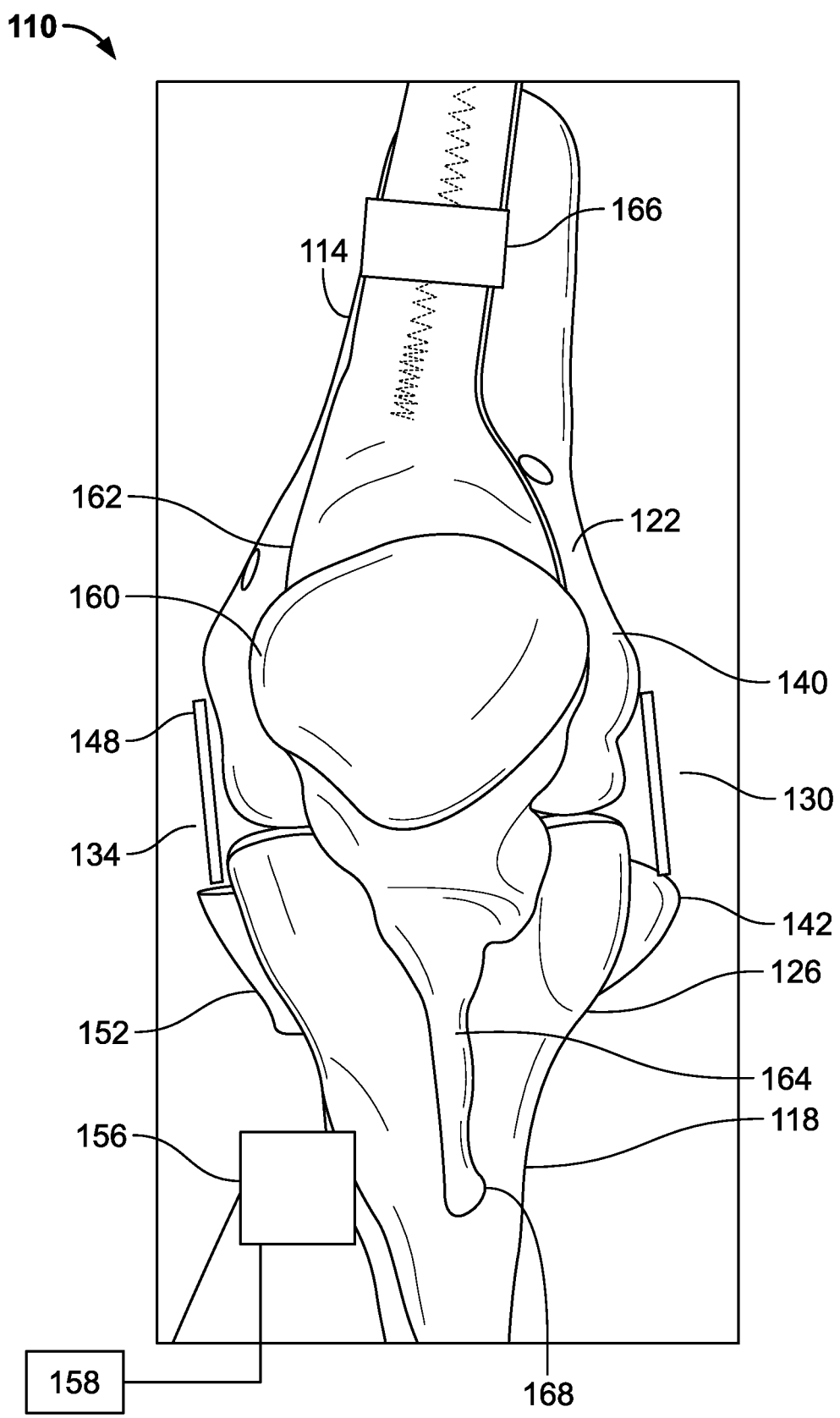
FIG. 3 is a front plan view of a simulated anatomical joint according to another aspect of the disclosure.

A simulated anatomical joint 110 according to a second arrangement is illustrated in FIG. 3. The simulated anatomical joint 110 of FIG. 3 is generally similar to the simulated anatomical joint 10 illustrated in FIG. 1 except where explicitly stated or illustrated otherwise. As such, elements such as ferrules and attachments similar to the ferrules and attachments illustrated in FIG. 1 and described above are included in the anatomical joint 110 of FIG. 3 though not illustrated. Further, like numerals correspond to like elements throughout FIGS. 1 and 3, such as the first artificial bone 114 and second artificial bone 118 of FIG. 3 corresponding to the first artificial bone 14 and second artificial bone 18 of FIG. 1. The simulated anatomical joint 110 of FIG. 3 further includes a third artificial bone 160, which is an artificial patella supported between an artificial quadriceps tendon 162 and patellar tendon 164. The artificial quadriceps tendon 162 extends into a third opening or duct 166 located on the first artificial bone 114 and the artificial patellar tendon 164 extends into a fourth opening or duct 168 located on the second artificial bone 118. The artificial quadriceps tendon 162 and patellar tendon 164 are connected to the first artificial bone 114 and second artificial bone 118 respectively to simulate the action the quadriceps and patellar tendons on a kneecap in a live knee joint. Artificial quadriceps tendon 162 and/or patellar tendon 164 may be connected to a stress measurement device such as the one described above. In this regard, stresses imposed on such tendons 162, 164 via different techniques and approaches may be evaluated using anatomical joint 110.

Figure 4:
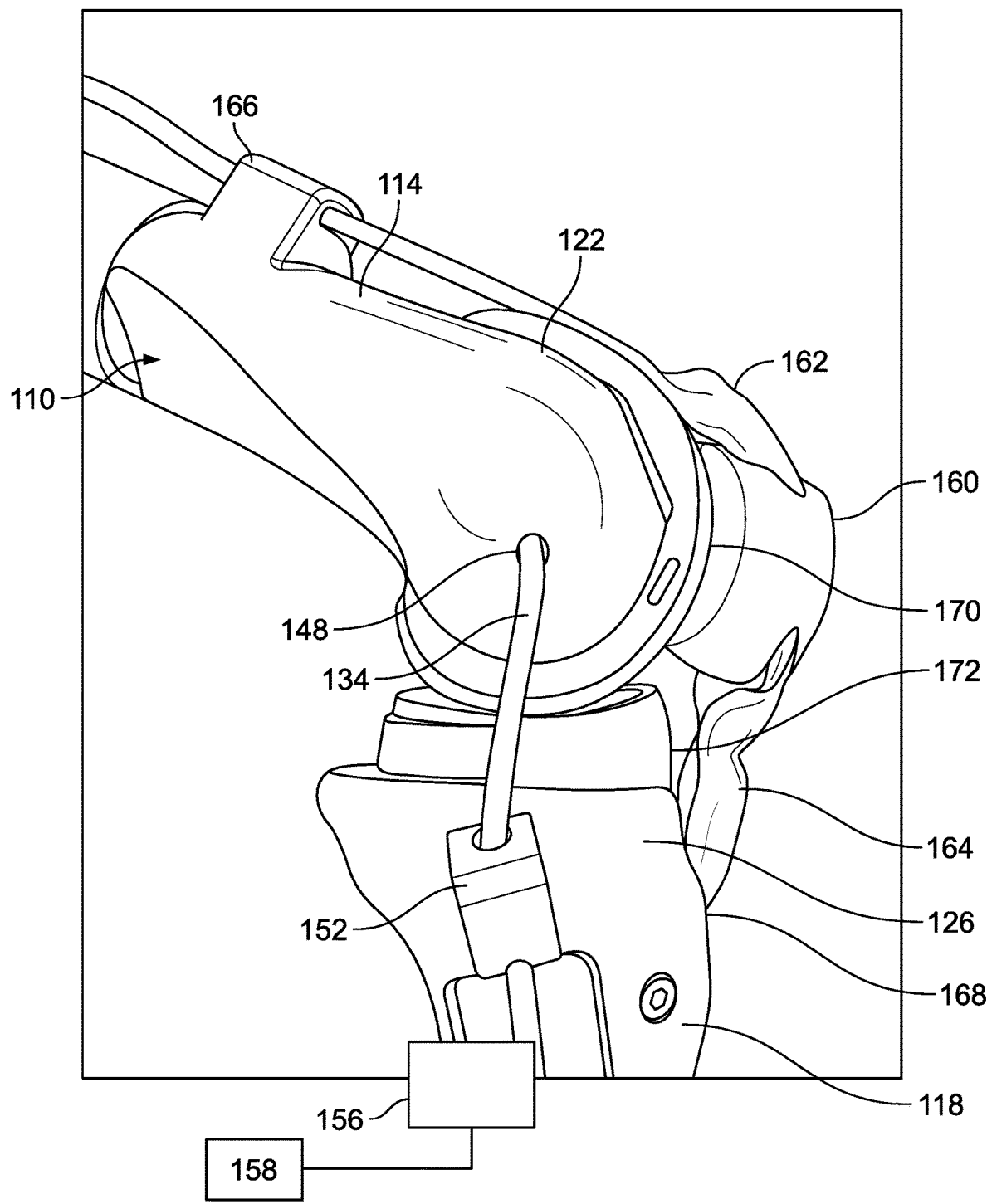
FIG. 4 is a side plan view of the simulated anatomical joint of FIG. 3 after application of a surgical intervention.

Turning to FIG. 4, the simulated anatomical joint 110 of FIG. 3 after an example intervention includes a femoral implant 170 disposed on a resected surface of the first artificial bone 114 and a tibial implant 172 disposed on a resected surface of the second artificial bone 118 in much the same manner as the same implants would be applied to a femur and tibia after a total knee arthroplasty. The simulated anatomical joint 110 can provide insight on the efficacy of the intervention, including the choice of resection and implants, by enabling a student or surgeon to observe stress measurements from the stress measurement feature and how the simulated anatomical joint 110 articulates after the intervention. Stresses can be observed across a range of articulation available to the anatomical joint 110, demonstrating the probable comfortable range of motion a patient would have if the same intervention was applied to a patient possessing the same pre-intervention joint geometry.

The simulated anatomical joints 10, 110 shown in FIGS. 1-4 simulate human knee joints. In other arrangements, the simulated anatomical joints 10, 110 include artificial bones and ligaments simulating any one or any combination of bones or ligaments naturally occurring in any human joint. For example, the simulated anatomical joint 10 may be constructed to include artificial bones and ligaments simulating all or any subset of the bones and ligaments of a knee joint, hip joint, elbow joint, shoulder joint, or any other human anatomical joint. In further examples, simulated knee joints according to other arrangements include additional artificial bones such as a fibula, a patella, or both. Though only one stress measurement output is illustrated in FIG. 1, any number of the artificial ligaments included in a simulated anatomical joint 10 may be connected to a stress measurement feature and microcontroller as described above with regard to the second artificial ligament 34.

Figure 5:
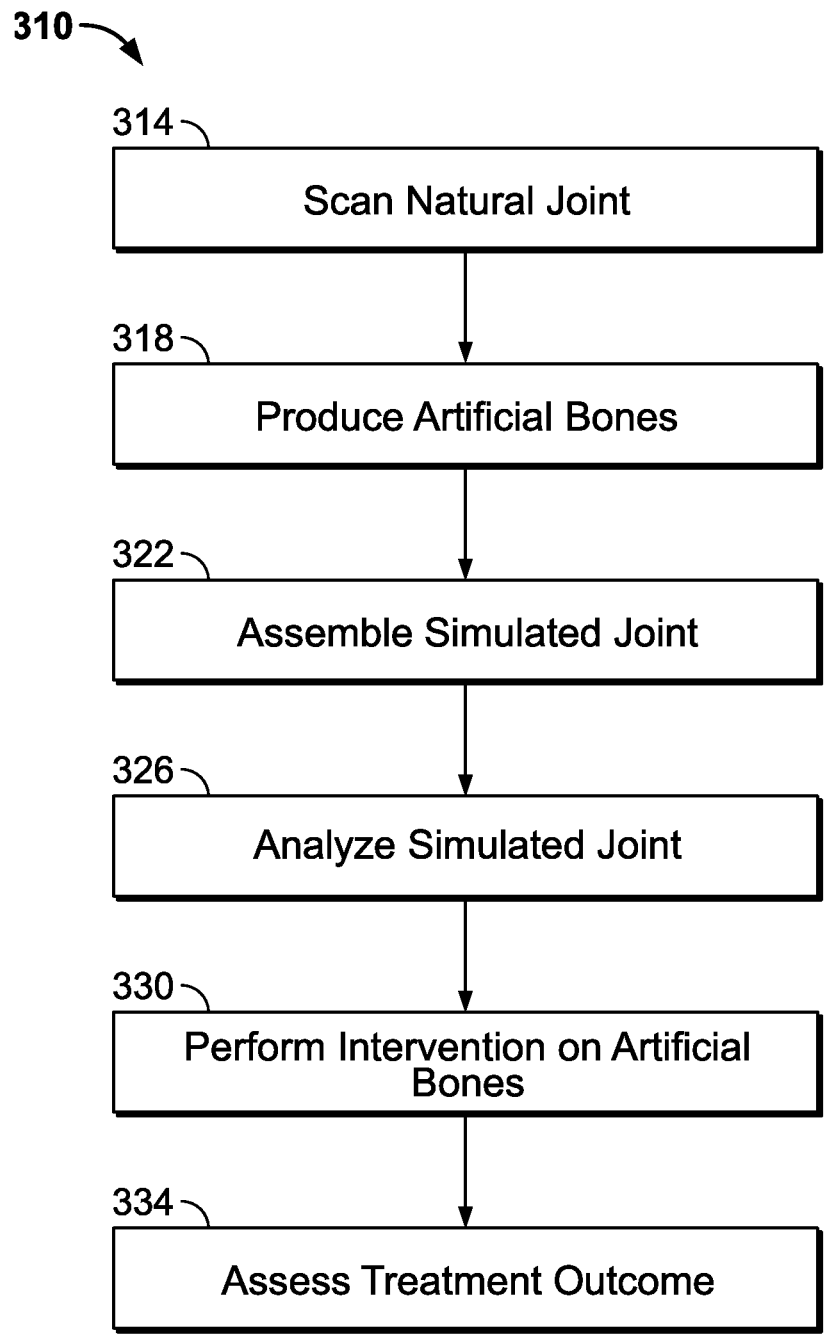
FIG. 5 is a flowchart representing a method related to simulated anatomical joints according to an aspect of the disclosure.

The simulated anatomical joint 10, 110 may be constructed and used according to a method 310 illustrated in FIG. 5. The method 310 includes a scanning or imaging step 314, where a patient or cadaver's joint to be simulated is scanned. The scanning step 314 may be conducted with any suitable scanning technology, such as, for example, computerized tomography (CT) scanning, magnetic resonance imaging (MRI), or ultrasound. The scanned joint may include an injury or deformity that is recorded by the scan. In a production step 318, data obtained in the scanning step 314 is used to produce artificial bones or artificial bone portions matching bones in the scanned joint, such as the first bone 14 and second bone 18 of the simulated joint 10 illustrated in FIG. 1. The bones may be produced according to any method that would enable translation of the data obtained in the scanning step 314 into a physical object. Example production methods include casting, injection molding, and additive manufacturing. Subject to any limitations of the scanning and the production methods, any injuries or deformities in the scanned joint are recreated in the artificial bones during the production step 318.

The artificial bones are arranged to simulate the scanned joint in an assembly step 322. The assembly step 322 includes installing artificial ligaments on the artificial bones to simulate the natural ligaments of the scanned joint, such as the first ligament 30 and second ligament 34 of the simulated joints 10, 110 illustrated in FIGS. 1-4. Any one or more of the artificial ligaments may be installed with a stress measurement feature as described above with regard to FIGS. 1-4. In various arrangements, openings through the artificial bones for the attachment and guidance of the ligaments, such as the threaded openings 39, 47, openings 40, 140, 48, 148, ducts 42, 142, 52, 152, 166, 168 and attachments 44, 54 are drilled or tapped in the assembly step 322 or are otherwise provided in the artificial bones in the production step 318. In some arrangements, the assembly step includes tensioning the artificial ligaments, such as by rotating the ferrules, to recreate the effects of a disease or injury condition in the simulated joint 10.

During an analysis step 326, a surgeon or student analyzes the simulated joint 10, 110 produced in the assembly step 322 to formulate a strategy for treatment. In some examples, the analysis step 326 may include manipulating the simulated joint 10, 110 to various positions throughout the natural range of articulation of the scanned joint. In further examples, analysis step includes observation of measurements from the one or more stress measurement elements at one or more degrees of articulation. Such observation can indicate the amount of displacement or stress caused by a deformity or injury at certain positions of the joint. The surgeon or student may consider the observed stress or stresses to formulate the strategy for treatment to determine what interventions could be necessary or beneficial if applied to the scanned joint.

If the treatment strategy formulated in the analysis step 326 includes a surgical intervention, the treatment may be enacted in an intervention step 330. In some examples, the intervention step 330 includes resecting the artificial bones in the same location and manner as the patient's bones would be resected in the chosen intervention. The chosen intervention may include certain techniques and approaches initially identified by the surgeon as being preferable for the particular condition, such as a gap balancing, measured resection technique, or kinematic alignment technique and an anterior referencing or posterior referencing technique, for example. The intervention step 330 is followed by an assessment step 334 wherein the surgeon or student assesses the outcome of the intervention. In various examples, the assessment step 334 includes installation of prostheses or implants on resected surfaces of the artificial bones. If the outcome of the intervention step 330 is satisfactory, the strategy for treatment formulated in the analysis step 326 can be finalized and enacted on the scanned join. If the outcome of the intervention step 330 is unsatisfactory, a new simulated joint 10, 110 may be constructed for testing a different intervention, which may include a different technique or approach.

Figure 6:
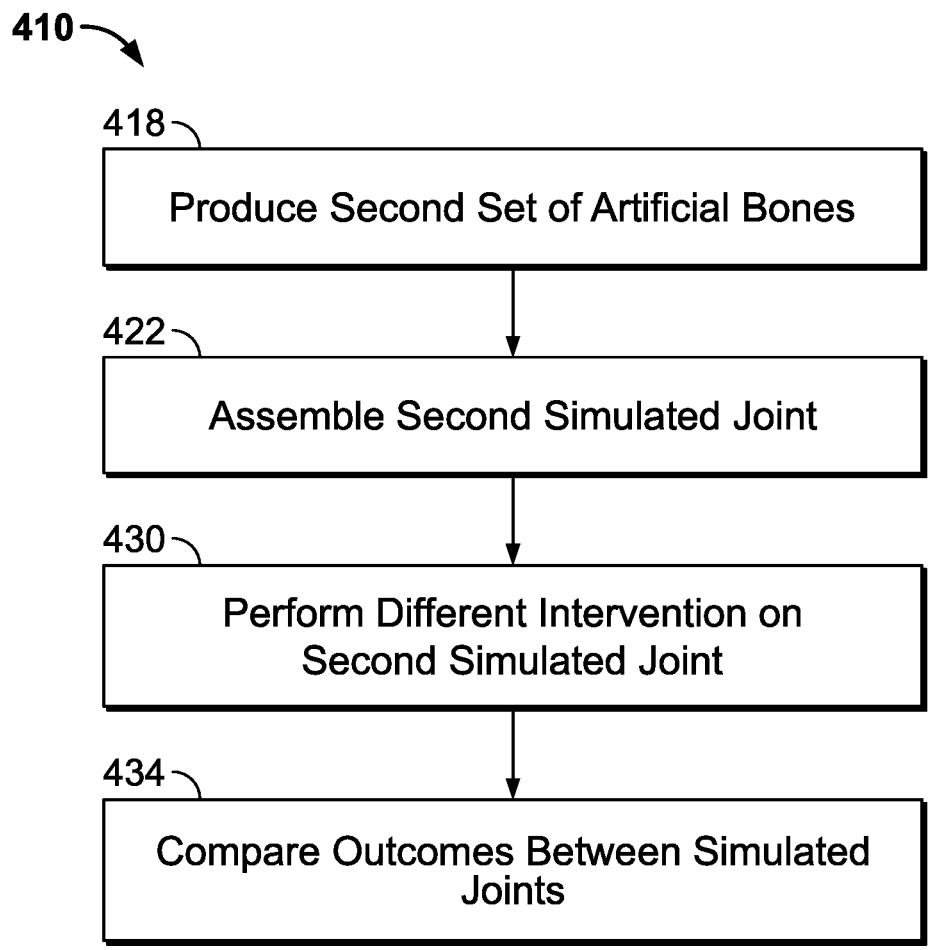
FIG. 6 is a flowchart representing a method related to simulated anatomical joints according to another aspect of the disclosure.

In some examples, the assessment step 334 includes an assessment method 410 as shown in FIG. 6. The assessment method 410 includes creation of a second simulated anatomical joint 10, 110 with a production step 418 and assembly step 422 generally similar to the production step 318 and assembly step 322 described above with regard to the method 310 of FIG. 5. In an intervention step 430, the second simulated joint 10, 110 is subjected to a different intervention than the one performed in the intervention step 330 of the method 310 of FIG. 5. In some examples of assessing interventions of a knee arthroplasty, an 8 mm resection is taken from an artificial femur in one simulated joint while a 10 mm resection is taken from an artificial femur in another simulated joint, followed by installation of appropriate femoral implants on resected surfaces of the artificial bones. However, it should be understood that the methods 310, 410 may be used on a simulation of any anatomical joint and may include any surgical interventions on the simulated joint. The outcome of the differing interventions are compared in a comparison step 434 that includes observation of articulation and stress measurements from both simulated anatomical joints 10, 110. The assessment method 410 may be repeated as many times as necessary within one assessment step 334. By creating multiple identical simulated anatomical joints 10, 110 and applying a different surgical intervention to each, it is possible to experimentally determine an optimal intervention on any unique joint. In a training setting, application of different interventions to a constant joint geometry in this manner can provide insight as to what interventions are likely to work well for a given type of disease or injury condition. In a clinical setting, a variety of interventions can be tested on simulations of a specific patient's diseased or injured joint before one intervention is selected to address the disease or injury.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A simulated anatomical joint, comprising:
a first artificial bone having a first articular surface;
a second artificial bone having a second articular surface matable to the first articular surface to simulate a natural anatomical joint; and
artificial ligaments connecting the first artificial bone to the second artificial bone such that the first articular surface is proximate to the second articular surface, the artificial ligaments connected to the first artificial bone and second artificial bone by respective ferrules, wherein each respective ferrule is threaded into the first artificial bone such that each respective ferrule is disposed within a respective opening of the first artificial bone to simulate stresses in the natural anatomical joint corresponding to the first artificial bone and second artificial bone.

2. The simulated anatomical joint of claim 1, further comprising a stress measurement device connected to at least one of the artificial ligaments and configured to measure stress in the artificial ligament connected to the measurement device.

3. The simulated anatomical joint of claim 2, further comprising a display configured to display force measured by the stress measurement device.

4. The simulated anatomical joint of claim 2, wherein the stress measurement device includes a Wheatstone bridge.

5. The simulated anatomical joint of claim 1, wherein the natural anatomical joint is a joint within a specific patient, and the first artificial bone and second artificial bone are constructed according to patient specific data collected from the natural anatomical joint.

6. The simulated anatomical joint of claim 5, wherein the patient specific data collected from the natural anatomical joint includes computed tomography data.

7. The simulated anatomical joint of claim 1, wherein the natural anatomical joint is a human knee joint.

8. The simulated anatomical joint of claim 1, wherein either or both of the first articular surface and the second articular surface includes a feature that would be considered a deformity if detected in the natural anatomical joint.

9. A method of constructing a simulated anatomical joint, comprising:
gathering patient specific data from a natural anatomical joint to be simulated;
constructing artificial bones having articular surfaces corresponding to articular surfaces of bones in the natural anatomical joint to be simulated using the patient specific data; and
connecting the artificial bones in an arrangement corresponding to the natural anatomical joint to be simulated with artificial ligaments and adjustably tensioning the artificial ligaments with respective ferrules threaded into at least one artificial bone from among the artificial bones to simulate stresses in the natural anatomical joint,
wherein the respective ferrules are threaded into the at least one artificial bone such that the respective ferrules are disposed within a respective opening of the at least one artificial bone.

10. The method of claim 9, wherein the natural anatomical joint includes a bony deformity.

11. The method of claim 10, wherein the constructing step includes reproducing the bony deformity in the corresponding artificial bone.

12. The method of claim 9, wherein the step of gathering patient specific data includes a computed tomography scan.

13. The method of claim 9, wherein the natural anatomical joint is a human knee joint.

14. The method of claim 9, including a step of implanting a stress measurement device configured to measure stress in the simulated anatomical joint into at least one of the artificial bones.

15. The method of claim 14, wherein the stress measurement device is a Wheatstone bridge.

16. A method of assessing a surgical intervention on an anatomical joint, comprising:
observing a simulated joint including:
a first artificial bone having a first articular surface,
a second artificial bone having a second articular surface matable to the first articular surface to simulate the anatomical joint, and
artificial ligaments connecting the first artificial bone to the second artificial bone such that the first articular surface is proximate to the second articular surface, the artificial ligaments connected to the first artificial bone and second artificial bone and adjustably tensioned by respective ferrules threaded into the first artificial bone such that each respective ferrule is disposed within a respective opening of the first artificial bone to simulate stresses in the anatomical joint corresponding to the artificial bones, wherein
the first and second artificial bones are produced according to a patient specific data gathered from the anatomical joint such that the first and second artificial bones reflect a patient specific deformity on an articular surface of the anatomical joint;
resecting the simulated joint having the patient specific deformity on a simulated articular surface in accordance with a first intervention;
implanting a joint prosthesis onto the resected simulated joint to form a simulated post-intervention joint; and assessing the first intervention by observing the joint stability of the simulated post-intervention joint based on the designated tension.

17. The method of claim 16, wherein either one or both of the first artificial bone and the second artificial bone include a stress measurement device configured to measure stress in the simulated joint.

18. The method of claim 17, wherein the observing and assessing steps include consideration of a stress measurement from the stress measurement device.

19. The method of claim 17, wherein the stress measurement device includes a Wheatstone bridge.

\* \* \* \* \*